June 3, 1958    E. J. SELYEM ET AL    2,837,379
HYDRAULIC TRACK ADJUSTER
Filed March 24, 1955
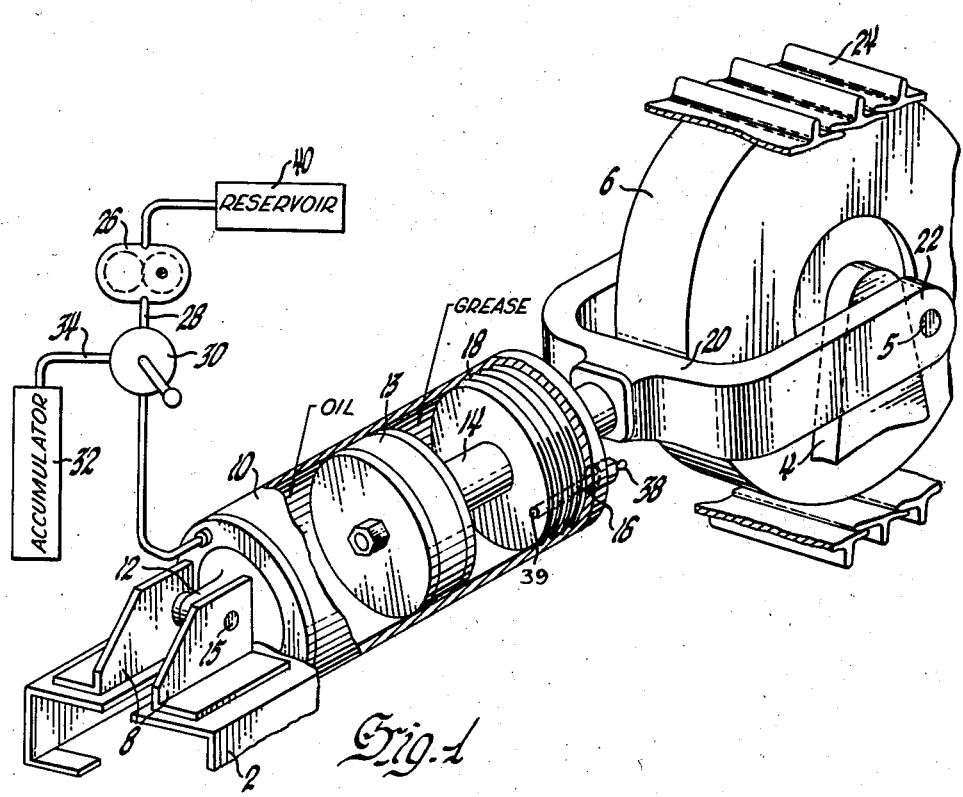
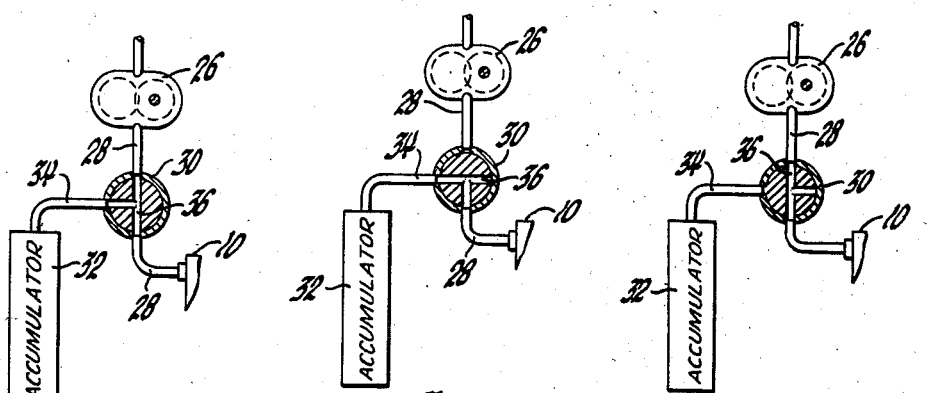
Inventors
Edwin J. Selyem &
Janis Mazzarins
By Paul Fitzpatrick
Attorney

United States Patent Office 2,837,379
Patented June 3, 1958

2,837,379

HYDRAULIC TRACK ADJUSTER

Edwin J. Selyem, North Royalton, and Janis Mazzarins, Cleveland, Ohio, assignors to General Motors Corporation, Detroit, Mich., a corporation of Delaware Application March 24, 1955, Serial No. 496,369

10 Claims. (Cl. 305—9)

This invention relates to track adjusting mechanisms and more particularly, to hydraulic track adjusting mechanisms for track laying vehicles.

Mechanical devices for maintaining endless tracks of track laying vehicles under desired tension are well known in the prior art. In a typical installation, one or more heavy coil springs are disposed to yieldably urge the track idler wheel forwardly against a fixed stop. The fixed stop is usually adjustable fore and aft to take up initial slack in the track linkage and provide for periodic readjustment necessitated by gradual wear of the track links. When rocks or other obstructions become lodged between the tracks and idler wheel or drive sprocket, the idler wheel moves rearwardly against the pressure of the coil spring until the obstruction has been dislodged and thereupon returns forwardly in response to spring pressure until arrested by the fixed stop. While this type of adjusting and recoil mechanism is adequate under normal conditions of operation, numerous problems arise in connection therewith, among which is the difficulty encountered in making periodic adjustments to take up track slack resulting from normal wear of the track linkage. Under field conditions, accumulation of rust, dirt and ice, etc., often make it extremely difficult to reset the fixed mechanical stops. Similarly, field disassembly of the mechanism presents considerable danger because of the high spring preload necessary to provide sufficient resistance to recoil.

An object of the present invention is to provide a hydraulic track adjusting mechanism wherein noncompressible fluid means may be injected and withdrawn selectively to provide a positive fixed stop limiting the maximum forward position of the track idler wheel.

Another object is to provide a hydraulic track adjuster employing yieldable fluid pressure for forwardly displacing a track idler and providing resistance to recoil thereof, and additional noncompressible fluid means for regulating and limiting the maximum forward position of the idler.

Another object is to provide a device of the stated character including manually operable valve mechanism for charging and lengthening, operating and shortening the device from a remote position.

A further object is to provide a device of the stated character including a high static pressure accumulator adapted to resist recoil of the idler wheel.

Still a further object is to provide a track tensioning and recoil mechanism which is simple to install, operate and disassemble.

These and other objects and advantages of the invention will become more fully apparent as reference is had to the accompanying specification and drawing wherein:

Fig. 1 is a fragmentary perspective view, partly in section, of a hydraulic adjusting mechanism and certain directly associated parts, including a schematic diagram of the fluid pressure system utilized in connection therewith.

Fig. 2 is a fragmentary diagrammatic illustration of the fluid pressure system shown in Fig. 1, illustrating the position of adjustment of the manual valve for charging the system and extending the adjusting mechanism.

Fig. 3 is a view similar to Fig. 2, showing the position of adjustment of the valve during normal operation of the mechanism; and Fig. 4 is a view similar to Figs. 2 and 3, showing the position of adjustment of the valve when it is desired to shorten the extended length of the mechanism.

Referring now to the drawings and particularly Fig. 1, there is illustrated a portion of a crawler tractor track frame 2 upon which is slidably mounted an idler wheel carrier 4. Rotatably mounted on carrier 4 by pivot shaft 5 is an idler wheel 6. Spaced rearwardly of wheel 6 are a pair of upstanding brackets 8 which are connected as by welding to the upper surface of frame 2. Extending between brackets 8 and idler wheel 6 is a hydraulic cylinder 10, the rearward end 12 of which is pivotally connected to brackets 8 by means of a transversely extending shaft 15. Disposed interiorly of cylinder 10 is a piston 13 which has rigidly connected thereto a forwardly extending piston rod 14. Piston rod 14 is surrounded by an annular plug 16, the outside diameter of which threadably engages the threaded inside diameter of the forward open end 18 of cylinder 10. At its forward extremity, piston rod 14 is provided with an integral forwardly extending yoke portion 20. Forward ends 22 of yoke portion 20, in turn, are pivotally connected to pivot shaft 5 of idler wheel 6. It will, thus, be seen that fore and aft movement of piston 13 in cylinder 10 will cause corresponding fore and aft movement of idler wheel 6 relative to track frame 2 and thus take up slack in the endless track 24.

In order to provide suitable pressure for actuating piston 13 forwardly in cylinder 10, a hydraulic pump 26, preferably engine driven, supplies fluid under pressure through hydraulic line 28. Line 28 has interposed therein a valve assembly 30, the purpose of which will be described shortly. Valve assembly 30 is also connected to a preload accumulator assembly 32 by means of hydraulic line 34. Accumulator 32 may be of any conventional type, but is preferably of the type wherein a free piston is normally urged to a "bottomed" position adjacent the connection with line 34 by a preloaded static fluid pressure. For a more detailed description of this construction, reference may be had to the copending application of Russell C. Williams et al., Serial No. 455,999, filed September 14, 1954, entitled Hydraulic Recoil Mechanism.

To actuate the piston 13 forwardly in cylinder 10, the valve assembly 30 is moved to the position shown in Fig. 2 wherein the T passage 36 permits fluid to pass from pump 26 through line 28 into the rear end of cylinder 10 and into line 34. As soon as piston 13 is moved forwardly a distance sufficient to take up the slack in endless track 24, valve assembly 30 is moved to the position shown in Fig. 3, wherein T passage 36 provides communication between cylinder 10 and accumulator 32 only. With valve assembly 30 in the position shown in Fig. 3, hydraulic fluid in the rear end of cylinder 10 is prevented from returning through line 28 to pump 26. Therefore, when piston 13 is required to recoil in cylinder 10 by an obstruction between idler wheel 6 and track 24, fluid in the rear end of cylinder 10 is forced through line 28 and valve assembly 30 into line 34. As soon as the recoil pressure in line 34 exceeds the preloaded pressure in accumulator 32, hydraulic fluid in line 34 is forced into the accumulator. After the impact causing recoil of piston 13, accumulator 32 will recover and drive the hydraulic fluid back through line 34, valve assembly 30, and line 28 to restore the piston 13 to its original forward position in cylinder 10.

In order to regulate the maximum extended position of idler wheel 6, the plug 16 which closes the forward end 18 of cylinder 10 is provided with a fitting 38, which is movable to either open or closed position. Fitting 38 permits introduction and withdrawal of a suitable non-compressible fluid, such as grease, into the forward end of cylinder 10 through drilled passage 39. It will be apparent that the maximum extended position of piston 13 will depend entirely upon the quantity of grease or other fluid present in the forward end of cylinder 10. In practice, it is desirable that the rearward end of cylinder 10 be charged as previously described by placing the valve assembly in the position shown in Fig. 2. Then, while retaining valve 30 in the position indicated, grease is introduced through fitting 38 to fill the cavity formed between the forward face of piston 13 and the forward end of cylinder 10. The valve assembly 30 is then turned to the position shown in Fig. 3 to form a non-compressible fluid link between piston 13 and accumulator 32. The high preloaded pressure of accumulator 32 then provides high resistance to recoil of the piston while the grease establishes the forward limit of movement of piston 13.

It should be particularly noted that the maximum forward extended position of idler wheel 6 may be quickly and easily adjusted to compensate for normal track wear by merely extracting a small quantity of grease from cylinder 10 while the valve assembly 30 is in the position shown in Fig. 2. It will, of course, be apparent that pump pressure will not only drive piston 13 forwardly the amount permitted by grease extraction, but in addition will add the necessary fluid required to maintain a non-compressible fluid link between piston 13 and accumulator 32 when valve 30 is returned to the position shown in Fig. 3. Of particular importance is the fact that no difficulties will be encountered in making such adjustments because of accumulation of rust, dirt, and ice, etc., since the regulating medium is disposed interiorly of the cylinder 10 and not exposed to the elements.

In addition to simplicity and ease of operation, the present invention has the further advantage of being readily disassembled without danger to the operator. As seen in Fig. 4, to disassemble the adjuster mechanism, it is only necessary to rotate valve assembly 30 to a position where T passage 36 provides communication between the cylinder 10 and pump 26. With the valve in this position, grease may then be introduced through fitting 38 causing piston 13 to be driven to its rearward limit, thereby forcing hydraulic fluid back through line 28 and pump 26 into reservoir 40.

While but one embodiment of the invention has been shown and described, it will be apparent that other changes and modifications may be made therein. It is, therefore, to be understood that it is not intended to limit the invention to the embodiment shown, but only by the scope of the claims which follow.

We claim:
1. A track adjusting mechanism comprising a hydraulic cylinder, a piston in said cylinder, a thrust member on said piston extending out of said cylinder, yieldable fluid pressure means urging said piston forwardly in said cylinder, and non-yieldable fluid means in said cylinder forming an abutment engageable by said piston to limit the forward movement thereof.

2. A track adjuster comprising a hydraulic cylinder having an open end, a piston movable in said cylinder, a piston rod connected to said piston and extending through said open end, an annular collar surrounding said rod and closing said open end, a source of yieldable fluid pressure communicating with one end of said cylinder to urge said piston forwardly in the former, and means for introducing and retaining a non-yieldable fluid in the forward end of said cylinder for controlling the forward limit of movement of said piston.

3. A track adjuster comprising a hydraulic cylinder, a piston slidably disposed in said cylinder, a piston rod connected to said piston and extending through said cylinder, a source of yieldable fluid pressure communicating with the rearward end of said cylinder to urge said piston forwardly in the former, and means for introducing a non-yieldable fluid in the forward end of said cylinder for regulating the forward limit of movement of said piston, said last mentioned means being selectively movable from one position permitting both injection and emission of said fluid to another position preventing escape of said fluid.

4. In a tracked vehicle having a track idler wheel, an adjuster for said idler wheel comprising a hydraulic cylinder having one end pivotally connected at a fixed point remote from said wheel, a piston slidably disposed in said cylinder, a piston rod connected to said piston and extending through the opposite end of said cylinder, said rod having a forked end engaging said wheel, a fluid pressure system connected to one end of said cylinder for urging said piston forwardly to a predetermined position in said cylinder, and valve means formed in the opposite end of said cylinder for introducing non-compressible fluid therein, said non-compressible fluid forming an abutment engageable by said piston establishing the said predetermined forward position of the latter.

5. In a tracked vehicle, the combination of a track idler wheel, an adjuster for said idler wheel comprising a hydraulic cylinder having one end pivotally connected at a fixed point remote from said wheel, a piston slidably disposed in said cylinder, a piston rod connected to said piston and extending through the opposite end of said cylinder, said rod having a forked end engaging said wheel, a fluid pressure system connected to one end of said cylinder for urging said piston forwardly to a predetermined position in said cylinder, a fluid injecting port formed in the opposite end of said cylinder for introducing non-compressible fluid therein to esablish said predetermined forward position of said piston, and means providing high resistance to rearward movement of said piston from said predetermined forward position, said means comprising a high pressure accumulator connected in communicating relation with said fluid pressure system and a valve assembly movable to a position wherein said non-compressible fluid forms a solid link between said accumulator and said piston.

6. A track adjuster comprising a closed hydraulic cylinder, a piston slidably disposed in said cylinder, a piston rod connected to said piston and extending through one end of said cylinder, a source of fluid pressure, conduit means providing communication between said source of pressure and one end of said cylinder, a valve body interposed in said conduit means, a second source of relatively high fluid pressure communicating with said valve body, a valve in said valve body, said valve being movable to a first position wherein fluid from said first source extends said piston forwardly in said cylinder, said valve being movable to a second position wherein fluid from said first source forms a non-compressible fluid link between said piston and said second source of relatively high fluid pressure, whereby to provide high resistance to recoil of said piston, and fluid means in the forward end of said cylinder for regulating the maximum forward position of said piston in said cylinder.

7. A track adjuster comprising a closed hydraulic cylinder, a piston slidably disposed in said cylinder, a piston rod connected to said piston and extending through one end of said cylinder, a source of fluid pressure, conduit means providing communication between said source of pressure and one end of said cylinder, a valve body interposed in said conduit means, an accumulator providing a source of relatively high fluid pressure and communicating with said valve body, a multi-position valve in said valve body, said valve being movable to a first position wherein fluid from said first source is introduced into said conduit and said cylinder to extend said piston forwardly in the latter, said valve being movable to a second position wherein said fluid in said conduit and said cylinder forms a non-compressible fluid link between said piston and said accumulator, whereby to provide high resistance to recoil of said piston, and fluid means in the forward end of said cylinder for regulating the maximum forward position of said piston in said cylinder.

8. A track adjuster comprising a closed hydraulic cylinder, a piston slidably disposed in said cylinder, a piston rod connected to said piston and extending through one end of said cylinder, a source of fluid pressure, conduit means providing communication between said source of pressure and one end of said cylinder, a valve body interposed in said conduit means, an accumulator providing a source of relatively high fluid pressure and communicating with said valve body, a multi-position valve in said valve body, said valve being movable to a first position wherein fluid from said first source is introduced into said conduit and said cylinder to extend said piston forwardly in the latter, said valve being movable to a second position wherein said fluid in said conduit and said cylinder forms a non-compressible fluid link between said piston and said accumulator, whereby to provide high resistance to recoil of said piston, fluid means in the forward end of said cylinder for regulating the maximum forward position of said piston in said cylinder, and valve means permitting increase or decrease in said last mentioned fluid means to alter said maximum forward position.

9. A track adjusting mechanism for a vehicle comprising an endless flexible track entrained about an adjustable idler wheel, said mechanism comprising relatively movable cylinder and piston elements, a piston rod carried by said piston element and projecting through one end of said cylinder, said cylinder and piston members being operatively connected between said vehicle and adjustable idler wheel, yieldable means acting on one side of said piston within said cylinder for yieldably urging relative movement of said piston and cylinder in one direction to tension said track, said yieldable means resisting relative recoil of said piston and cylinder in the other direction, and a non-yieldable fluid means contained in said cylinder on the other side of said piston to limit relative movement of said piston and said cylinder in said one direction to a predetermined fixed extent.

10. A track adjusting mechanism for a vehicle comprising an endless flexible track entrained about an adjustable idler wheel, said mechanism comprising relatively movable cylinder and piston elements, a piston rod carried by said piston element and projecting through one end of said cylinder, said cylinder and piston members being operatively connected between said vehicle and adjustable idler wheel, yieldable means acting on one side of said piston within said cylinder for yieldably urging relative movement of said piston and cylinder in one direction to tension said track, said yieldable means resisting relative recoil of said piston and cylinder, in the other direction, and selectively adjustable non-yieldable fluid means contained in said cylinder on the other side of said piston to limit relative piston and cylinder movement in said one direction to a predetermined fixed amount.

References Cited in the file of this patent

UNITED STATES PATENTS

| 2,322,977 | Schroder et al. | June 29, 1943 |
| 2,669,972 | Cross | Feb. 23, 1954 |
| 2,677,238 | Greer | May 4, 1954 |